United States Patent
Adderly et al.

(10) Patent No.: US 10,375,437 B2
(45) Date of Patent: Aug. 6, 2019

(54) SIGNAL STRENGTH BOOKMARKING FOR MEDIA CONTENT

(71) Applicant: International Business Machines Corporation, Armonk, NY (US)

(72) Inventors: Darryl M. Adderly, Morrisville, NC (US); Jonathan W. Jackson, Durham, NC (US); Ajit Jariwala, Cary, NC (US); Eric B. Libow, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 406 days.

(21) Appl. No.: 14/743,012

(22) Filed: Jun. 18, 2015

(65) Prior Publication Data
US 2016/0345187 A1   Nov. 24, 2016

Related U.S. Application Data (63) Continuation of application No. 14/717,274, filed on May 20, 2015, now abandoned.

(51) Int. Cl.
*G11B 27/34* (2006.01)
*H04L 29/06* (2006.01)
(Continued)

(52) U.S. Cl.
CPC ........... *H04N 21/435* (2013.01); *G11B 27/34* (2013.01); *H04L 65/4084* (2013.01);
(Continued)

(58) Field of Classification Search
CPC ............ H04N 21/435; H04N 21/2353; H04N 21/262; H04N 21/4312; H04N 21/47217; H04N 21/8547; H04N 21/2402; H04N 21/44209; G11B 27/34; H04L 65/4084; H04L 65/60; H04L 65/80; H04L 67/322;
(Continued)

(56) References Cited

U.S. PATENT DOCUMENTS 7,459,898 B1 * 12/2008 Woodings ............. G01R 23/16
                                                324/76.19
8,701,137 B2    4/2014 Katpelly et al.
(Continued)

OTHER PUBLICATIONS

Kuchi et al., "Multi-View and Pause-View in a Second Life Client," 2010 International Symposium on Collaborative Technologies and Systems (CTS), May 17-21, 2010, pp. 133-142, Copyright© 2010, IEEE DOI: 10.1109/CTS.2010.5478515.
(Continued)

*Primary Examiner* — Hitesh Patel
*Assistant Examiner* — Eui H Kim
(74) *Attorney, Agent, or Firm* — James L. Olsen (57) ABSTRACT

A wireless connection may be established between a first computing device and a second computing device. A first media content may be displayed by the first computing device. The wireless connection may be determined to include a signal strength. The signal strength may be determined to be below a signal strength. In response to the determining that the wireless connection includes a signal strength and determining that the signal strength is below a threshold, a first bookmark may be generated. The first bookmark may reference a location within the first media content.

5 Claims, 6 Drawing Sheets

(51) Int. Cl.

| | | |
|---|---|---|
| *H04N 21/235* | (2011.01) | |
| *H04N 21/262* | (2011.01) | |
| *H04N 21/431* | (2011.01) | |
| *H04N 21/435* | (2011.01) | |
| *H04N 21/466* | (2011.01) | |
| *H04N 21/472* | (2011.01) | |
| *H04N 21/8547* | (2011.01) | |

(52) U.S. Cl.
CPC .............. *H04L 65/60* (2013.01); *H04L 65/80* (2013.01); *H04N 21/2353* (2013.01); *H04N 21/262* (2013.01); *H04N 21/4312* (2013.01); *H04N 21/47217* (2013.01); *H04N 21/8547* (2013.01); *H04N 21/4668* (2013.01)

(58) Field of Classification Search
CPC ......... H04L 41/50; H04L 43/08; H04L 47/24; H04L 47/805; H04L 67/04; H04L 67/18; H04L 67/2828; H04W 76/02
See application file for complete search history.

(56) References Cited

U.S. PATENT DOCUMENTS

| | | | |
|---|---|---|---|
| 8,799,300 B2 | 8/2014 | Saretto et al. | |
| 8,856,827 B1* | 10/2014 | Krause | H04N 21/8545 725/37 |
| 8,955,002 B2* | 2/2015 | Seiden | H04N 21/44218 725/102 |
| 9,077,779 B2* | 7/2015 | Lesser | H04L 67/42 |
| 9,224,290 B1 | 12/2015 | Mason et al. | |
| 9,401,179 B2* | 7/2016 | Mese | G11B 27/30 |
| 9,443,272 B2 | 9/2016 | Wan et al. | |
| 9,525,998 B2 | 12/2016 | Sheth et al. | |
| 2004/0008970 A1 | 1/2004 | Junkersfeld et al. | |
| 2010/0042642 A1 | 2/2010 | Shahraray et al. | |
| 2010/0094866 A1* | 4/2010 | Cuttner | H04N 7/163 707/723 |
| 2011/0055415 A1 | 3/2011 | Cuesta et al. | |
| 2011/0070819 A1* | 3/2011 | Shimy | G06Q 30/02 455/3.05 |
| 2011/0225314 A1 | 9/2011 | Leinonen | |
| 2011/0289015 A1* | 11/2011 | Mei | G06Q 10/04 705/347 |
| 2011/0314502 A1* | 12/2011 | Levy | H04N 7/106 725/46 |
| 2012/0124456 A1* | 5/2012 | Perez | G06Q 30/02 715/200 |
| 2012/0246302 A1 | 9/2012 | Lafleur et al. | |
| 2012/0315014 A1 | 12/2012 | Shuster | |
| 2013/0054700 A1* | 2/2013 | Allibhoy | G06Q 10/10 709/204 |
| 2013/0067333 A1 | 3/2013 | Brenneman | |
| 2013/0103814 A1 | 4/2013 | Carrasco et al. | |
| 2013/0176415 A1 | 7/2013 | Kim et al. | |
| 2013/0195119 A1 | 8/2013 | Huang et al. | |
| 2013/0262635 A1* | 10/2013 | Kim | H04L 67/06 709/219 |
| 2014/0007169 A1 | 1/2014 | Bhogal et al. | |
| 2014/0068692 A1 | 3/2014 | Archibong et al. | |
| 2014/0164403 A1 | 6/2014 | Shahraray et al. | |
| 2014/0201766 A1 | 7/2014 | Stepanov et al. | |
| 2014/0201767 A1 | 7/2014 | Seiden et al. | |
| 2014/0237525 A1 | 8/2014 | Rothschild et al. | |
| 2014/0258270 A1 | 9/2014 | Reese et al. | |
| 2014/0298169 A1 | 10/2014 | Williams | |
| 2015/0058417 A1* | 2/2015 | McConnell | H04L 67/306 709/204 |
| 2015/0179130 A1 | 6/2015 | Smadi et al. | |
| 2015/0181300 A1 | 6/2015 | Rajan | |
| 2015/0327023 A1* | 11/2015 | Park | H04W 4/043 455/456.3 |
| 2015/0370818 A1* | 12/2015 | Des Jardins | G06F 16/435 707/734 |
| 2016/0134913 A1 | 5/2016 | Itagaki | |
| 2016/0134945 A1* | 5/2016 | Gower | H04N 21/234345 725/88 |
| 2016/0232131 A1* | 8/2016 | Liu | G06F 17/211 |
| 2016/0234560 A1 | 8/2016 | Wiseman et al. | |

OTHER PUBLICATIONS

Mell et al., "The NIST Definition of Cloud Computing: Recommendations of the National Institute of Standards and Technology," National Institute of Standards and Technology, U.S. Department of Commerce, Special Publication 800-145, Sep. 2011, 7 pages, Gaithersburg, MD.

Montpetit et al., "The Future of Mobile TV: When Mobile TV Meets the Internet and Social Networking," Mobile TV: Customizing Content and Experience, Human-Computer Interaction Series, 2010, pp. 305-326, © Springer-Verlag London Limited 2010, DOI: 10.1007/978-1-84882-701-1_21.

Unknown, "Getting Started With the Multi-Room DVR System," Scientific Atlanta, 16 pages http://www.cisco.com/web/consumer/support/userguides2/4003869.pdf.

Unknown, "Your guide to Multi-Room DVR," Optimum, Version 3.1, 18 pages, © 2014 CSC Holdings, LLC https://www.optimum.net/assets/pdf/user-guides/en/dvr_plus_en.pdf.

Unknown, "Easily share and enjoy content from various devices," Samsung, Copyright© 1995-2015 Samsung, 1 page. http://www.samsung.com/sa_en/smarthub/.

Unknown, "Connect, Get Social, Have Fun!," Tango, 1 page, © 2015 Tango, http://www.tango.me/.

Unknown, "How to Sync Your Media Across Your Entire House with XBMC," How-To Geek, originally published in Sep. 2011, 9 pages, Copyright© 2006-2015 How-To Geek, LLC http://www.howtogeek.com/75535/how-to-sync-your-media-across-your-entire-house-with-xbmc/.

Unknown, "Directv Whole Home DVR: DVR in every room, without a DVR in every room," Directv, 4 pages http://www.directv.com/technology/wholehome.

Viticci, "Read It Later Reborn: Pocket Saves Everything "For Later"," MacStories, Apr. 17, 2012, Copyright 2015 MacStories, pp. 1-25. http://www.macstories.net/news/read-it-later-reborn-pocket-saves-everything-for-later/.

Adderly et al., "Signal Strength Bookmarking for Media Content," U.S. Appl. No. 14/717,274, filed May 20, 2015.

List of IBM Patents or Patent Applications Treated as Related.

* cited by examiner

SIGNAL STRENGTH BOOKMARKING FOR MEDIA CONTENT

BACKGROUND

This disclosure relates generally to media content, and more specifically, to bookmarking media content.

Media content (e.g., video content) may be stored on removable media, such as Digital Versatile Disks (DVD), Universal Serial Bus (USB) flash drives, internal storage, such as a hard drives (e.g., Digital Video Recorders (DVR)), or flash memory in portable media players. Media content may also be streamed to computing devices via a network.

DVRs, client computing device applications, and/or streaming services may allow a user to lock media content frames of an image (e.g., pause a live show). Users may also have the ability to bookmark particular media content frames of interest. A bookmark is a reference marker within the media content that includes a time stamp in order to facilitate quick access to a particular portion of the media content. For example, when a user pauses the media content to engage in an unrelated task, the user may issue a request for a computing device to generate a bookmark such that the user may resume watching the media content from the bookmarked location at a later time. The user may also annotate the bookmark with metadata, which may specify information as to what the bookmark or media content concerns. For example, the user may generate the media content title, the author, a particular scene associated with the bookmark, or date that the bookmark was generated.

SUMMARY

One or more embodiments are directed to a method, a system, and a computer program product. A wireless connection may be established between a first computing device and a second computing device. A first media content may be displayed by the first computing device. The wireless connection may be determined to include a signal strength. The signal strength may be determined to be below a signal strength. In response to the determining that the wireless connection includes a signal strength and determining that the signal strength is below a threshold, a first bookmark may be generated. The first bookmark may reference a location within the first media content.

The above summary is not intended to describe each illustrated embodiment or every implementation of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to media content, and more specifically, to bookmarking media content. While the present disclosure is not necessarily limited to such applications, various aspects of the disclosure may be appreciated through a discussion of various examples using this context.

In some situations, when a user views media content, the user's computing device may fall below a wireless connection signal strength threshold with a media content provider server, even though there may still be a wireless connection. This may cause frustration to a user, as the low signal strength may cause media content frames to skip or be displayed in a delayed manner. Although some solutions bookmark media content when a wireless connection is completely lost, bookmarking may not occur at degraded signal strength levels even though a user may not successfully view the media content when the associated frames skip or are provided in a delayed manner. Accordingly, embodiments of the present disclosure are directed to generating bookmarks when a connection that has been established has fallen below a signal strength threshold, even though there is still a connection.

In other situations, when a user is viewing media content via a streaming service, the user may engage in a different task that requires the user to physically move to a different area (e.g., suddenly tend to a screaming child in another room). Accordingly, the user may not desire or have the time to pause and request a bookmark for the media content. Therefore, embodiments of the present disclosure are directed to generating bookmarks without user requests when a connection that has between established between two local computing devices (e.g., a mobile phone and a set top box) has fallen below a signal strength threshold. Moreover, a user may have multiple bookmarks located in a library and may have no way to organize or prioritize such bookmarks. Accordingly, embodiments of the present disclosure are directed to generating bookmarks without user requests when a connection that has been established has fallen below a signal strength threshold between two local devices. Embodiments are further directed towards prioritizing multiple bookmarks.

As described herein, the terms "local," "close proximity," or the like when indicating that a computing device is local to another computing device or close in proximity in relation to another computing device, or when referencing "local computing devices;" this may mean that two or more computing devices are close enough to each other to establish a connection between each other. For example, at 3 feet, 5 feet, or any other suitable distance between two or more computing devices, a signal strength may be emitted above a signal strength threshold (e.g., −60 db) between the computing devices such that a connection may be established between the computing devices. Moreover, when a computing device determines that there is a signal strength, the signal strength may be any suitable value (e.g., −100 db, etc.).

Figure 1:
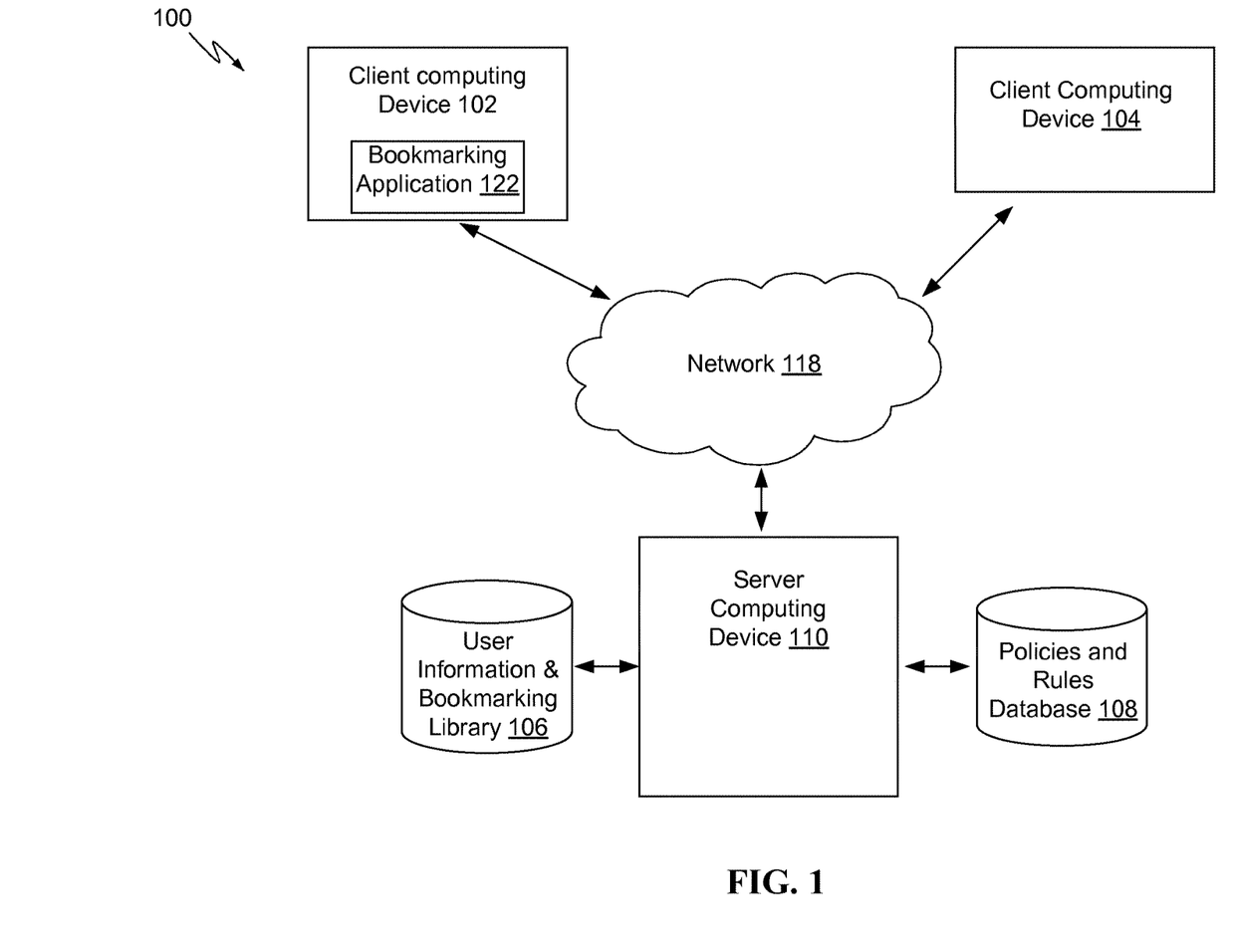
FIG. 1 is a block diagram of an example media content environment, according to embodiments.

FIG. 1 is a block diagram of an example media content environment 100, according to embodiments. The media content environment 100 may include a first client computing device 102 (e.g., a sending user's touch pad), a second client computing device 104 (e.g., a smart television), one or more server computing devices 110, a network 118, a user information and bookmarking library 106, and a policies and rules database 108. The client computing device 102 may also include a bookmarking application 122. In some embodiments, the media content environment 100 may be the cloud computing environment 50 of FIG. 5 (or included in the cloud computing environment 50), as described herein.

Figure 4:
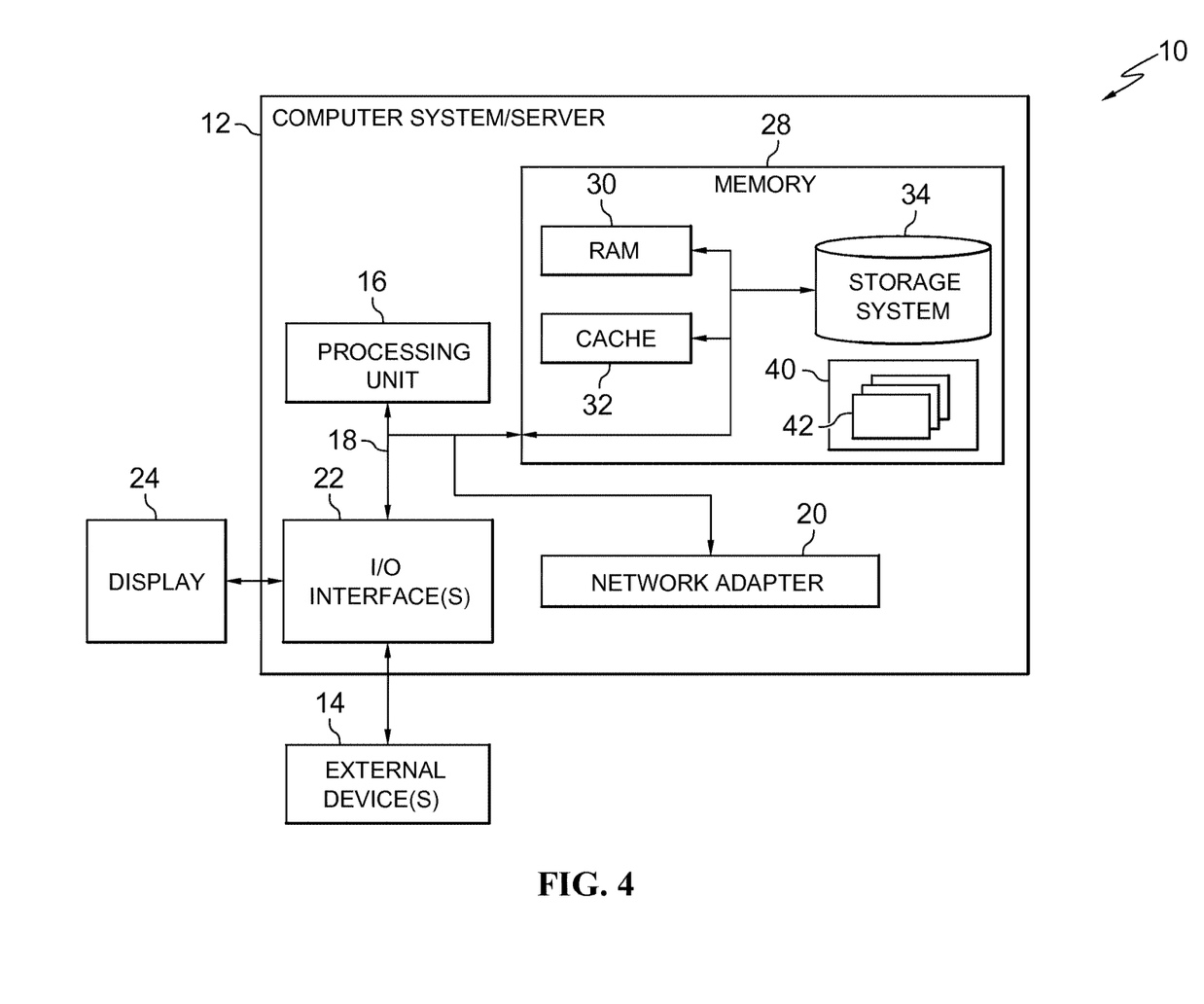
FIG. 4 depicts a cloud computing node according to embodiments of the present invention.
Figure 5:
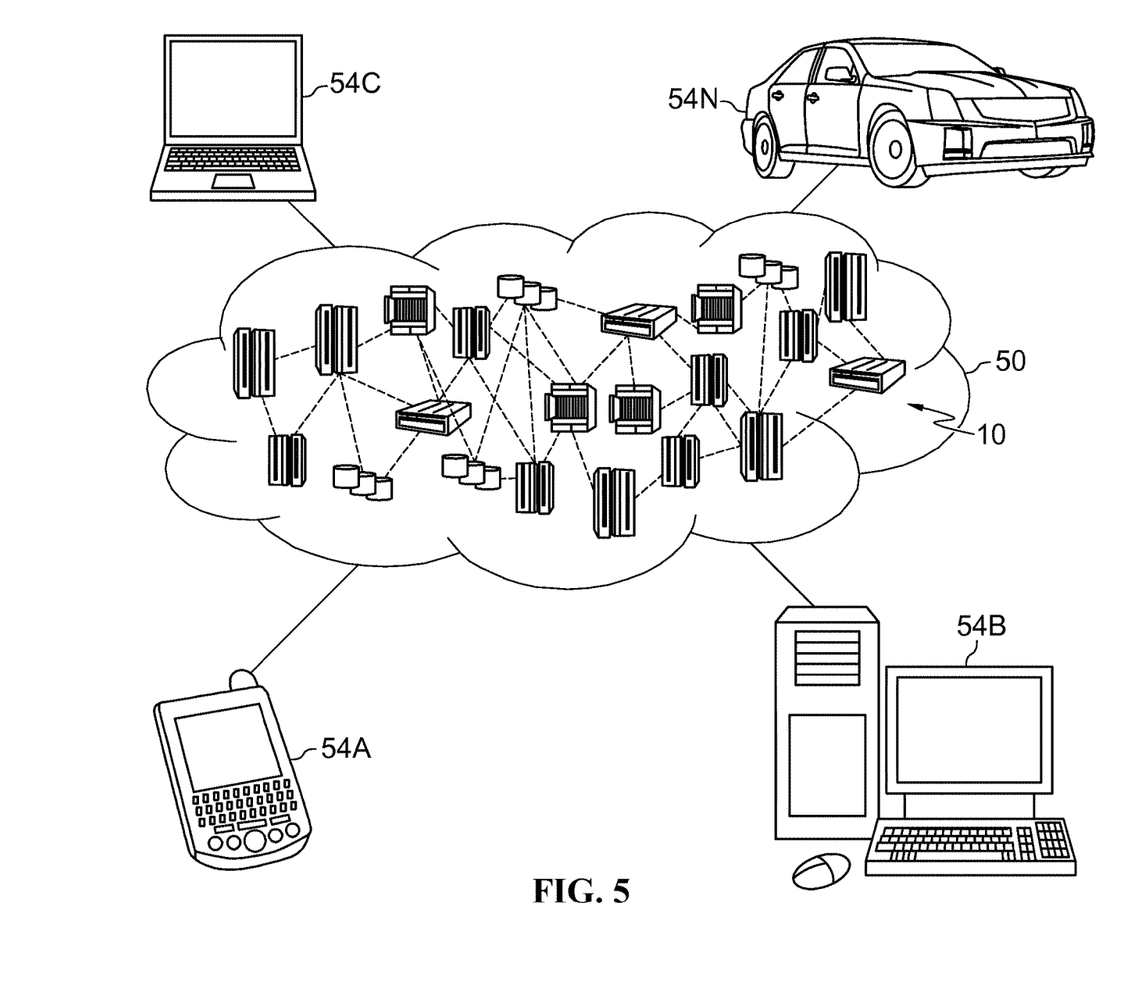
FIG. 5 depicts a cloud computing environment according to embodiments of the present invention.

In some embodiments, the client computing devices 102, 104, and/or the server computing devices 110 may be configured the same or analogous to the computer system/server 12, as specified in FIG. 4 or cloud computing nodes of FIG. 5 (e.g., 54A, 54B, 54C, and/or 54N). In some embodiments, the client computing device 102 may establish a wireless connection between either the client computing device 104 (e.g., a set top box) and/or server computing device 110, as described herein. In some embodiments, the client computing device 102 may include a bookmarking application 122 to determine whether the signal strength of the wireless connection is below a threshold, and generate a bookmark in response to the determining, as described in more detail herein. In various embodiments, the client computing device 104 and/or server computing device 110 may also include the bookmarking application 122. In some embodiments, client computing devices 102 and 104 may simply correspond to two different client computing devices that are associated with two different users. Accordingly, in some examples, two user bookmarking applications (associated with two client computing devices 102 and 104) of the same or different streaming account may generate bookmarks when a signal strength is below a threshold.

The client computing devices 102 and/or 104 may establish a connection with the server computing device 110 (or with each other) via one or more networks 118, such as a local area network (LAN), a general wide area network (WAN), and/or a public network (e.g., the Internet). Specifically, the network 118 may be a content delivery network (CDN) or multicast network, which may be utilized by streaming service providers. The network 118 may also be a wireless fidelity (Wi-Fi) network, a Wi-Fi Direct network, Bluetooth®, a radio network, a cellular network, a satellite network (e.g., for utilizing Global Positioning System (GPS) capabilities within a computing device as described herein), a cable network, a landline-based network, the Internet, intranets, a telephone network, a television network, data networks, or other communication mediums connecting multiple computing devices to one another.

In embodiments, the server computing device 110 stores and provides the media content to client devices 102 and/or 104. In some embodiments, the client computing devices 102 and/or 104 may contribute to providing the media content. For example, client computing device 104 may be a set top box (e.g., a DVR) or smart television (e.g., a television that includes a graphical user interface and processing capabilities), configured to receive media content signals from server computing device 110, and provide the media content signals to a television display screen. In some embodiments, the server computing device 110 may include a bookmarking module to receive the bookmarked locations specified by the bookmarking application 122 and provide the media content associated with the bookmarks at a later time. In other embodiments the client computing devices 102 and/or 104 store the media content locally such that the media content and bookmarks are both stored and provided by the client computing devices 102 and/or 104 without server computing device 110 interaction. In some embodiments, there may be more servers than server computing device 110 to provide media content. For example, server computing device 110 may be a web server that is associated with a particular web page. When a user selects a particular movie on the web page, the web server may transmit a message identifying the movie to a media server. The media server may then stream the file that is associated with the selected movie to the client computing device 102 of the user (e.g., via a Real Time Protocol (RTP)). The client computing device 102 may include a module to decode and play the file associated with the movie.

The server computing device 110 may include various data stores for embodiments of the present disclosure. For example, user information and bookmarking library 106 may be utilized to store user information and associated bookmarking content. In an illustrative example, the user information and bookmarking library 106 may store user profile information of users A, B, and C, and each bookmark within particular media content associated with the users. In some embodiments, the user information and bookmarking library 106 may allow the server computing device 110 to track various users' bookmarks regardless of whether the users share a same (or different) service provider account. The user information and bookmarking library 106 may also include all of the metadata that each user has annotated each bookmark with. In some embodiments, the user information and bookmarking library 106 may be separate data stores. For example, one data store may provide user information only, and a second data store may provide bookmarked content only.

The policies and rules database 108 may specify and store predetermined rules that match particular conditions. For example, conditions may correspond to different times in a day (e.g., 8 a.m., 10 p.m., etc.), and the rules may correspond to what genre media content bookmarks to suggest to the client computing devices 102 and/or 104 according to the different times in the day. For example, if a user bookmarked both a romantic movie and a high-energy war movie, and it was 10 p.m. at night, the policies and rules database 108 might specify that any time after 9 p.m., a bookmarked "romantic movie" should be suggested to a user, which may better help the user prepare for bed than the high-energy war movie. The policies and rules database 108 is further described herein.

Figure 2:
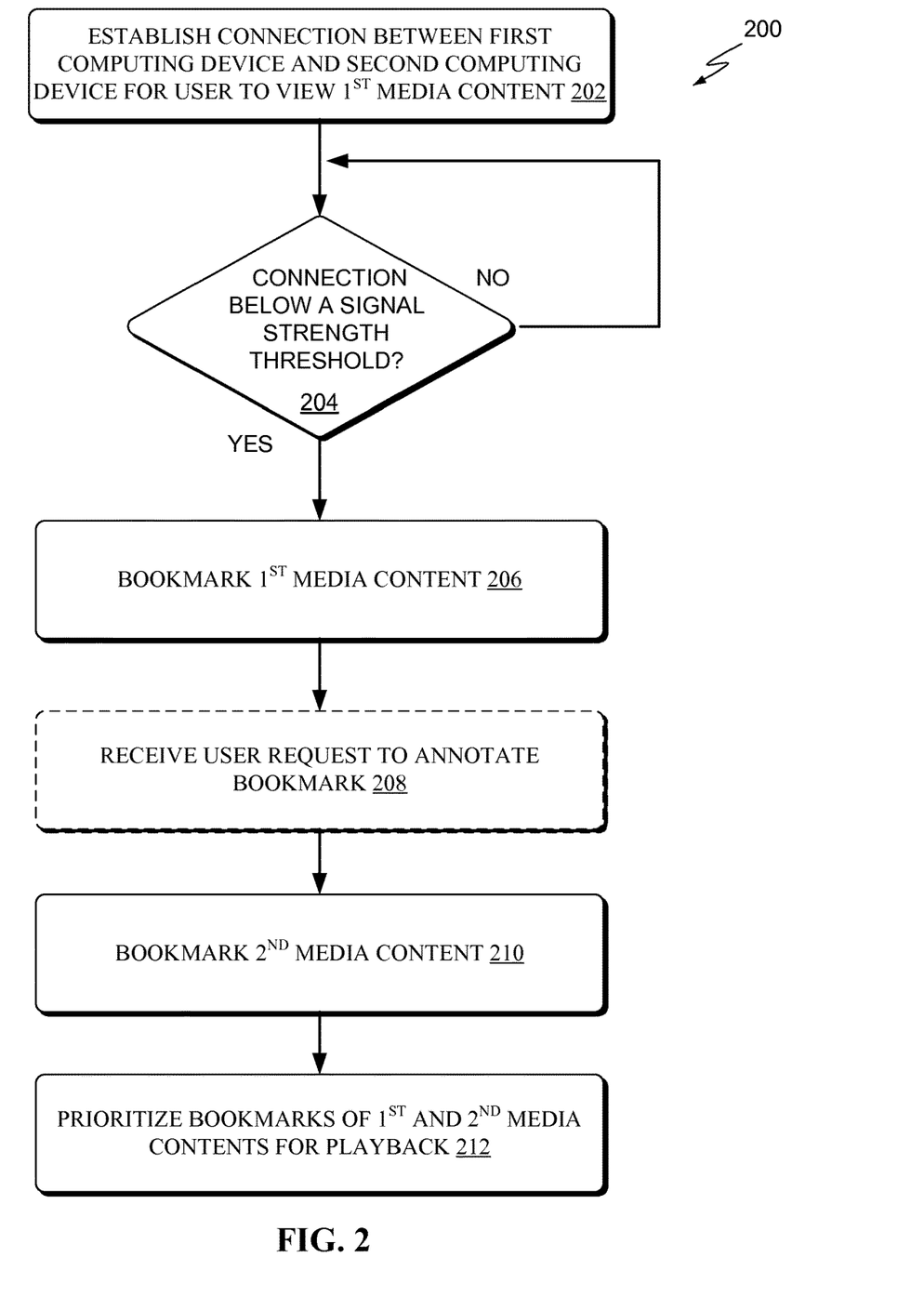
FIG. 2 is a flow diagram of an example process for generating a plurality of bookmarks and prioritizing the bookmarks accordingly, consistent with embodiments.

FIG. 2 is a flow diagram of an example process 200 for generating a plurality of bookmarks and prioritizing the bookmarks accordingly, consistent with embodiments. In some embodiments, process 200 may begin with block 202 when a first computing device (e.g., a mobile phone) establishes a connection with a second computing device (e.g., a server computing device) in order for a user of the first computing device to view a first identified media content (e.g., Movie A). As described above, the connection may be a Wi-Fi, Bluetooth®, satellite, or any other connection for embodiments of the present disclosure. For example, a smart mobile phone may establish a Wi-Fi connection with a server computing device that streams the video content that the user will watch on the smart phone. In another example, a smart watch may establish a Bluetooth® connection with a set top box computing device, as described in more detail below.

In block 204, according to some embodiments, a bookmarking application of a computing device may determine whether the connection between the first and second computing devices is below a signal strength threshold. The computing device may include a radio configured to receive (and/or transmit) media content according to the signal strength of the connection between the two computing devices. In some embodiments, when the signal strength is below the threshold, the computing devices may be transmitting or receiving media content at a degraded level such that each frame sequence of the media content may be displayed to the user in a delayed manner. In these embodiments, there may still be a signal strength to keep a connection established, but the signal strength may be degraded. In other embodiments, the signal strength threshold may be a value zero such that only when a connection is lost between two local devices, is the signal strength below a threshold. The signal strength threshold may be any suitable signal strength value. For example, the threshold may be any value below −70, −80, or −90 decibels (db) in a received signal strength indicator (RSSI) range. The signal strength may alternatively be measured in decibel-milliwatts (dbm), or any other appropriate unit measurement. Moreover, any suitable standards other than RSSI may be utilized, such as received channel power indicator (RCPI). In some embodiments, if the established connection does not fall below the signal strength threshold, then block 204 may be repeated to continually monitor the signal strength between the two computing devices. For example, a mobile phone computing device may continually poll (e.g., every 0.5 seconds) a set top box computing device to monitor the signal strength.

In some embodiments, in response to the bookmarking application determining that the connection is below a signal strength threshold, the bookmarking application may perform block 206 to generate a bookmark of the first media content at a point substantially concurrent with the determining. For example, a user may view the first media content, which may be a streamed clip. A bookmarking application may then determine that the signal strength of the streamed clip has fallen below a signal strength threshold (e.g., −70 DB). Consequently, 0.3 seconds, 0.4 seconds, 1 second or any suitable time after the determining or actual lowering of the signal strength below the threshold, the bookmarking application may then bookmark the first media content. Accordingly, once the user establishes a connection again, the user may resume watching the first media content from the point at which (or close to the point) the signal strength fell below the threshold. In these embodiments, a user's computing device that fell below a signal strength threshold but regained a signal strength above the threshold, may display, in response to the determining that the wireless connection is above the signal strength threshold, a notification at the computing device. The notification may prompt a user associated with the computing device to resume watching the first media content beginning from the book mark.

In some embodiments, the bookmark may include an associated visual thumbnail that contains the media content frame (e.g., video scene) at which point the signal strength fell below the threshold value. In some embodiments, the bookmark may include listed indicia and metadata that describes the bookmark, which may be located in a library of bookmarks. In some embodiments, one or more users may bookmark multiple sections of the first media, for example, to identify the beginning and ending of a particular desired scene. In some embodiments, a first computing device associated with a first user (e.g., mobile phone of first user) may generate a first bookmark of the first media content. A second computing device associated with a second user (e.g., second user's touch pad) may also generate a second bookmark of the first media content. The first and second bookmarks may be displayed to the first and/or second computing devices such that both users may view both the first and second bookmarks pertaining to the first media content. The displaying of all of the bookmarks for each device may be useful for a user who switches computing devices to watch the media content (e.g., a user may watch media content from a smart television and view the media content from his or her mobile device later while on a bus). The displaying of all bookmarks may also be useful for all members of the same streaming service account to decipher which bookmarks belong to which user.

In block 208, the computing device may receive a user request to annotate the bookmark with metadata that describes the first media content. For example, as soon as a bookmarking application of a computing device generates a bookmark, the bookmarking application may cause an associated computing device to display a notification to the computing device associated with a user that was viewing the media content. The notification may specify that a signal strength has been lost or degraded and that a bookmark has been consequently generated. The notification (or any notification described herein) may be any suitable notification. For example, the notification may be auditory, visual indicia (e.g., a Short Message Service (SMS) text, alert dialog screen, Light Emitting Diodes (LED), etc.), or a push notification. In response to the notification, the user may then generate metadata concerning the bookmark. For example, the user may type within a bookmark field, the scene associated with the bookmark, the data the bookmark was generated, etc.

In block 210, consistent with some embodiments, a bookmarking application from one or more computing devices may bookmark a second media content. For example, at a first time, a first user may bookmark the first media content, which is associated with a first movie. At a second time, the first user (or another user) may view a second media content, which is associated with a second movie. A computing device may then bookmark the second media content. The bookmarking application may perform block 210 in various manners. For example, the bookmark of the second media content may be generated in response to a signal strength being below a threshold, which is identical to block 204. The bookmarking of the second media content may also occur in response to a user request. For example, a user may have paused the second media content to perform an unrelated task and request to bookmark the second media content for later viewing. In various embodiments, multiple bookmarks may be generated that are associated with multiple media contents per block 210 (e.g., generate a third bookmark for a third movie, generate fourth and fifth bookmarks for a fourth movie, etc.)

In block 212, one or more computing devices may prioritize the bookmarks of the first and second media contents for playback at a later time. For example, a computing device may generate an available time estimate that a user (who has generated the bookmarks) has to view media content. The computing device may compare a time remaining after the first bookmark of the first media content with the available time estimate, and compare the time remaining after the second bookmark of the second media content with the available time estimate. In response to the comparing a time remaining after the first and second bookmarks, the computing device may determine that the time remaining after the first bookmark of the first media does not exceed the available time estimate. The computing device may then display a notification to recommend that a user associated with the first computing device view the first media content after the first bookmark based on the determining that the time remaining after the first bookmark of the first media content does not exceed the available time estimate.

In an illustrative example of block 212, a user's bookmark library may include a first media content movie that is bookmarked with 5 minutes remaining after the bookmark. The library may include a second media content movie that is bookmarked with 2 hours remaining after the bookmark. The time may be 8 a.m. in the morning and the user may have to take a train to work, which is 15 minutes away. Accordingly, in embodiments, a user's bookmarking application may generate an available time estimate that the user has 15 minutes to watch media content.

The generation of the available estimate may be performed in various manners. For example, using the illustration above, a user may request from a GPS application (which may be part of the bookmarking application) on the user's mobile phone that the GPS application provide a visual route from the user's starting location to work. The user may further request a time estimate that the user has until the user arrives at work. The GPS application may then consequently provide the estimated time until the user arrives at work. Accordingly, the bookmarking application may then determine that because the estimated time of arrival at work is 15 minutes, the user has 15 minutes to watch media content, which may be the generated available time estimate. The bookmarking application may then compare each of the times remaining after the first and second bookmarks (5 minutes for first bookmark; 2 hours for second bookmark) to the generated time estimate. The second media content that corresponds to the 2 hours remaining after the second bookmark surpasses the available time estimate to watch media content of 15 minutes. However, the first media content of 5 minutes does not exceed the 15 minute available time estimate. Therefore, the bookmarking application may display a notification at the user's mobile phone to recommend that the user view the first media content bookmark.

In some embodiments, the generating of the available time estimate may be based on predictive analytics. Predictive analytics may be an application module that extracts information from existing data sets in order to determine patterns and predict future outcomes and trends. For example, using the illustration above, the user may input data into a predictive analytics module (which may be part of the bookmarking application) that specifies the user's schedule Monday through Sunday. Accordingly, the predictive analytics module may provide an available time estimate based on the clock time of day (e.g., 7 a.m.), and provide bookmarked recommendations accordingly. In some embodiments, the user's schedule and generated time estimate may be included in the policies and rules database 108 of FIG. 1.

In some embodiments, the prioritizing bookmarks of the first and second media contents in block 212 may be based on generating a mood estimate of a user. For example, if the user is in a somber or sad state, the bookmarking application or other module may estimate that the user is in such state and consequently recommend a comedy subject matter, theme, topic, etc. bookmark for the user to view. Alternatively, if the user is in a bored state for example, the bookmarking application or other module may recommend a high-action engaging subject matter bookmark. The generation of the mood estimate may occur in various manners. For example, a first server computing device (e.g., server computing device 110) may query a second server computing device that is associated with the user's social media server. The social media server may then transmit each of the user's social media correspondence to the first computing device. The first computing device may include a Natural Language Processing (NLP) module to help generate the mood estimate.

NLP is the ability of a computing device module to understand human speech or written language. The module may perform various methods and techniques for analyzing words and phrases (syntactic analysis, semantic analysis, etc.) of the user's social media posts. The module may be configured to recognize and analyze any number of natural languages. In embodiments, module may parse passages of the applicable social media posts. Further, the module may include various submodules to aid NLP. These modules may encompass, but are not limited to, tokenizers, part-of-speech (POS) taggers, semantic relationship identifiers, and syntactic relationship identifiers. In some embodiments, the NLP module may recognize key words or phrases in social media posts, such as "happy," "tired," "bored," "mad," etc. and consequently associate the words or phrases with the mood of the user. Accordingly, the bookmarking application or other module may generate a mood estimate of a user and then determine the subject matter of various media contents. The bookmarking module may then notify the user's computing device to recommend that a user select a particular bookmark based on the generating of the mood estimate and based on the determining of the subject matter of the media contents. For example, a bookmarking module may determine that a user is in a sad mood by identifying key words and phrases, such as "sad," "bad day," etc., and also use NLP to identify uplifting movies that are associated with various bookmarks. Accordingly, the bookmarking module may match a sad mood of a user to a bookmark that is part of an uplifting movie. In some embodiments, the matching of the user's mood to particular bookmarks may be part of the policies and rules database 108 of FIG. 1.

In some embodiments, the prioritizing bookmarks of the first and second media contents in block 212 may be based on the clock time of day and/or day of the week. For example, if a couple engaged in a date activity every Friday night and was home by 11 p.m., the bookmarking application may cause an associated computing device to display a notification at 11 p.m. every Friday night to recommend that a user (or set of users) view bookmarked media that includes relationship-themed media content. As discussed above, various methods may be utilized to recommend the bookmarks. For example, a user may input a schedule to a predictive analytics module (which may specify that the user engages in a date activity every Friday night), and genre preferences by the day and time of day (e.g., specify to recommend episodes that are part of a series on weekends). In some embodiments, NLP may be utilized to determine subject matter of the media content. The bookmarking application or other module may match the media content to the time of day/and or day of week, as discussed above. The user's schedule and suggested media content to match the schedule may be included in the policies and rules database 108.

Although the process 200 illustrates a particular order of blocks, each block may occur in any suitable order that is not illustrated in the process 200. For example, in block 210 a computing device may bookmark a second media content before block 208 where a computing device receives a user request to annotate a bookmark. In some embodiments, a server computing device or client computing device hard drive or memory may include a bookmarking application (e.g., bookmarking application 122 of FIG. 1) to perform the process 200.

Figure 3:
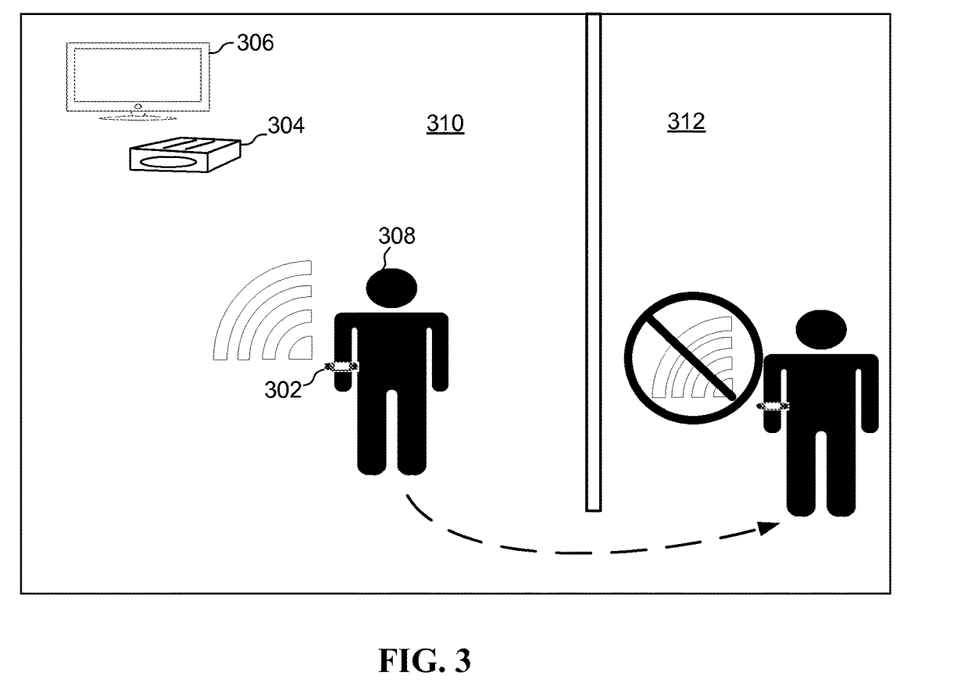
FIG. 3 is an example diagram illustrating how a bookmark may be generated based on a wireless connection being below a signal strength threshold between various local computing devices, according to embodiments.

FIG. 3 is an example diagram illustrating how a bookmark may be generated based on a wireless connection being below a signal strength threshold between various local computing devices, according to embodiments. FIG. 3 illustrates room 310 and room 312. Within room 310, there may be a television 306 with computing capabilities and/or a set top box 304 with computing capabilities, and a user 308 that is wearing a smart watch 302. Although the user 308 is wearing a smart watch 302, the user 308 may have any suitable computing device in possession. For example, the computing device may be smart glasses, a mobile phone, a portable computer, a laptop or notebook computer, a tablet computer, a pocket computer, a handheld radio, a remote control, or any other suitable computing device.

In an illustrative example, the user 308 may desire to view media content on the television 306. In some embodiments, the television 306 may be a smart television that includes a graphical user interface with various applications that are associated with movie/show streaming services. The server computing device associated with the streaming service may authenticate a user's credentials such that the user may open the streaming service application to watch a desired movie. In some embodiments, when the streaming service server computing device authenticates the user's credentials, the user's smart watch 302 may establish a wireless connection (e.g., a Bluetooth® wireless connection) with the television 306 and/or the set top box (e.g., DVR) at a first time. In some embodiments, before the first time, the user may have configured the smart watch 302 to recognize and retain the identification address of the television 306 and/or the set top box 304. The retention of the identification addresses may allow for a connection between each of the computing devices to be continually made, without user input, when a signal is emitting above a threshold with respect to the smart watch 302 and the television 306 and/or the set top box 304. In some embodiments, the smart watch 302, the television 306 and/or the set top box 304 may have GPS antennas and modules such that each of the device's coordinates and media content may be determined and shared. In these embodiments, a bookmarking application of the smart watch 302 may query the coordinates and media content of other local devices (e.g., the television 306 and/or the set top box 304). This may allow a user associated with the smart watch 302 to view other users' (e.g., a user of the television 306) bookmarks and/or annotations for shared media content.

In some embodiments, after the wireless connection has been established between the smart watch 302 and the television 306 and/or the set top box 304, the smart watch may determine that the wireless connection is below a signal strength threshold. This determination may occur when the user 308 walks into room 312. As discussed above, the threshold may be any suitable value (e.g., values below −90 decibels). Each threshold signal strength value may correspond to a distance at which the smart watch 302 is from the television 306 and/or the set top box 304, such 3 feet, 5 feet, 10 feet or any corresponding distance. In some embodiments, in response to the signal strength being below the signal strength threshold (e.g., the user 308 being in room 312), the smart watch 302 may generate a bookmark within the associated movie at a point substantially with the determination that the wireless connection is below a signal strength threshold, as discussed above.

Consistent with some embodiments, the smart watch may reestablish a wireless connection above the signal strength threshold with the television 306 and/or the set top box 304. In some embodiments, in response to the reestablishing of the wireless connection, the smart watch 302 may display a notification to a user of the smart watch 302 to prompt the user to resume watching media content beginning from the bookmark. For example, the user 308 may have walked into room 312, which may have caused the smart watch to generate a bookmark within the media content. The user may have finished tasks within the room 312 and may walk back into room 310 to resume watching the media content on the television 306. Accordingly, in some embodiments, when the user walks back into room 310 (i.e., when the wireless connection is reestablished above the signal strength threshold), the notification may be provided to the user 308 such that the user may resume watching the media content.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
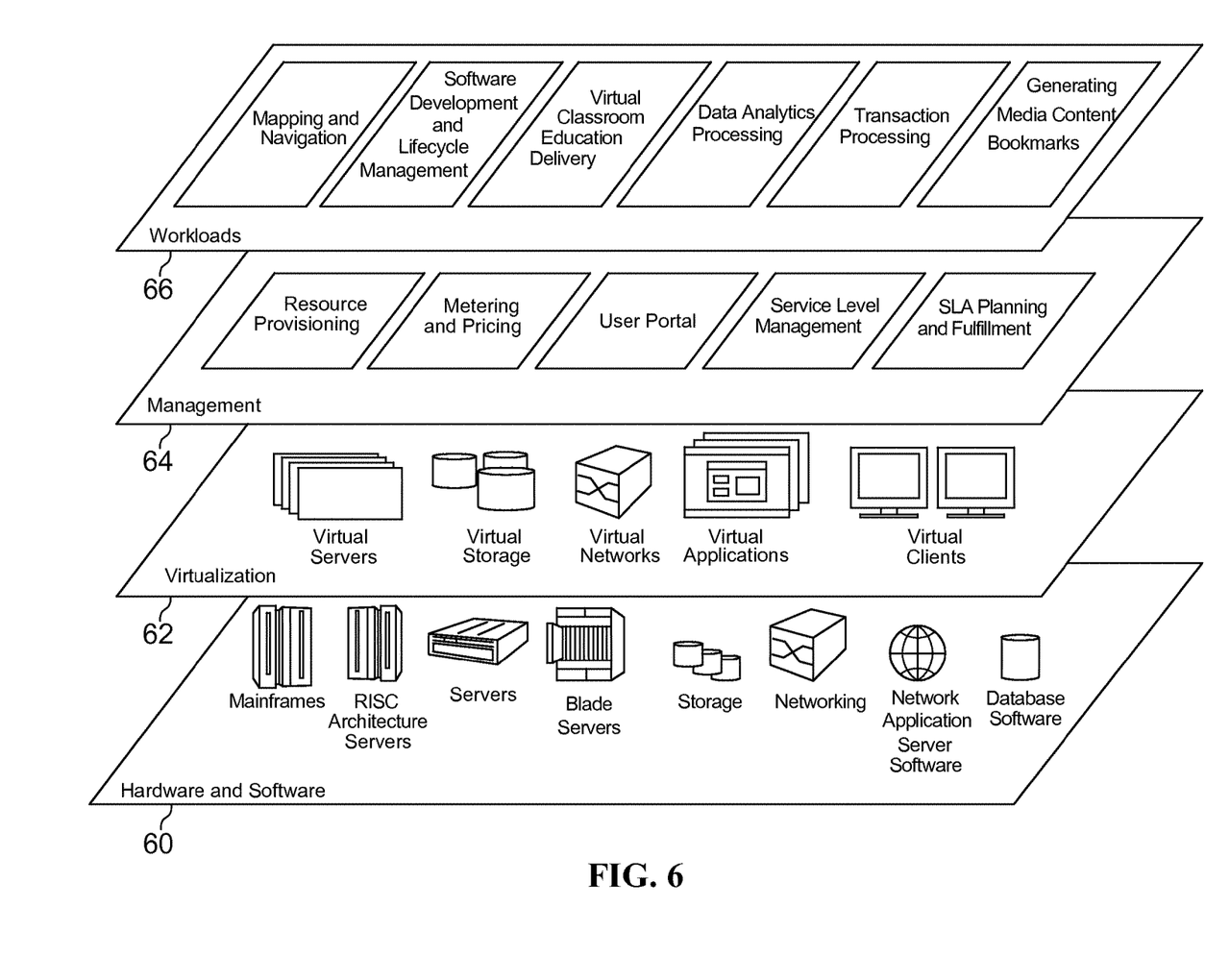
FIG. 6 depicts abstraction model layers according to embodiments of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating media content bookmarks 96.

Aspects of the present invention may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, comprising:
establishing a wireless connection between a first computing device and a second computing device, the first computing device displaying a first media content received from the second computing device;
determining that the wireless connection includes a signal strength that is above a first threshold and determining that the signal strength is below a second threshold, wherein the signal strength above the first threshold and below the second threshold causes the first media content to be at a degraded level such that it causes a delay in a display of the first media content to the first computing device wherein the signal strength above a first threshold and below a second threshold of the first and second computing devices is a value that indicates the connection is not lost;
in response to the determining that the wireless connection includes a signal strength that is above the first threshold and in response to the determining that the signal strength is below the second threshold, generating a first bookmark, the first bookmark referencing a location within the first media content at a point in time corresponding to the delay in the display of the first media content to the first computing device, wherein a user may view the first media content at the point in time corresponding to the delay;
establishing a second wireless connection between a third computing device and the first computing device at a second time, the first computing device displaying a second media content, received from the third computing device;
determining that the second wireless connection includes a second signal strength that is above the first threshold and determining that the second signal strength is below the second threshold, wherein the second signal strength above the first threshold and below the second threshold causes the second media content from the third computing device to be at a degraded level such that it causes a delay in display of the second media content to the first computing device; wherein the second signal strength above a first threshold and below a second threshold of the first and third computing devices is a value that indicates the connection is not lost;

in response to determining that the second wireless connection includes the second signal strength that is above the first threshold and in response to determining that the second signal strength is below the second threshold, generating a second bookmark, the second bookmark referencing a location within the second media content at a point in time corresponding to the delay in the display of the second media content to the third computing device, wherein the user may view the second media content at the point in time corresponding to the delay;

generating, via a Natural Language Processing (NLP) module configured to perform syntactic and semantic analysis of the user's social media posts, a mood estimate of the user associated with the first computing device, the NLP module including a tokenizer, a part-of-speech (POS) tagger, a semantic relationship identifier, and a syntactic relationship identifier;

determining that the mood estimate of the user is a first mood based on key words recognized by the NLP module in the user's social media posts, the mood estimate specifying that the user has a first mood;

determining, via the NLP module, that a subject matter of the first media content is a first subject matter and that a subject matter of the second media content is a second subject matter;

prioritizing the first bookmark higher than the second bookmark based on the subject matter of the first media content being the first subject matter and the mood estimate specifying that the user has the first mood, wherein the prioritizing causes a recommendation that the user associated with the first computing device watch the first media content beginning at the first bookmark instead of the second media content beginning at the second bookmark; and displaying, based on the prioritizing of the first bookmark higher than the second bookmark, a notification, the notification includes the recommendation that the user view the first media content beginning at the first bookmark instead of the second media content at the second bookmark.

2. The method of claim 1, further comprising:

determining, after the generating of the first bookmark, that the wireless connection is above the second threshold;

displaying, in response to the determining that the wireless connection is above the second threshold, an auditory notification at the first computing device, the auditory notification prompting the user associated with the first computing device to resume watching the first media content beginning from the first bookmark; and transmitting, in response to determining that the wireless connection is above the second threshold, a Short Message Service (SMS) text to the second computing device, the SMS text specifying that the signal strength was degraded and that the first bookmark has been generated.

3. The method of claim 1, further comprising receiving a request from the user associated with the first computing device to annotate the first bookmark with metadata, the metadata describing the first media content, wherein the metadata includes a visual thumbnail containing a media content frame of the first media content at the point in time corresponding to the delay, wherein the metadata further includes a media content tile, an author, and a scene associated with the first media content, wherein the metadata further includes a date the bookmark was generated.

4. The method of claim 1, further comprising:

generating an available time estimate that a user of the first computing device has to view media content;

comparing a time remaining after the first bookmark of the first media content with the available time estimate, and comparing a time remaining after the second bookmark of the second media content with the available time estimate;

determining that the time remaining after the first bookmark of the first media content does not exceed the available time estimate; and displaying, based on the determining that the time remaining after the first bookmark of the first media content does not exceed the available time estimate, a notification at the first computing device, wherein the notification includes a recommendation that the user associated with the first computing device view the first media content beginning from the first bookmark.

5. A computer-implemented method comprising:

establishing a first wireless connection between a first computing device and a second computing device, the first computing device for use in displaying a first media content, the second computing device corresponding to a streaming service that streams the first media content to the first computing device, wherein the streaming service authenticates a user in order to view the first media content;

in response to the streaming service authenticating the user, establishing a second wireless connection between the first computing device and a third computing device, the third computing device corresponding to a mobile device;

determining that the signal strength between the first computing device and the third computing device is below a threshold;

in response to the determining that the signal strength between the first computing device and the third computing device is below a threshold and without a request from the user, generating a first bookmark, the first bookmark being displayed to the first computing device and referencing a location within the first media content, the first bookmark includes a visual thumbnail that contains a media content frame within the first media content at which point the signal strength fell below the threshold;

in response to the generating of the first bookmark, receiving a user request to annotate the first bookmark;

generating a second bookmark referencing a location within a second media content;

generating a mood estimate of a user associated with the third computing device by a Natural Language Processing (NLP) module configured to perform syntactic and semantic analysis of the user's social media posts, the NLP module including a tokenizer, a part-of-speech tagger, a semantic relationship identifier, and a syntactic relationship identifier;

determining that the mood estimate of the user is a first mood based on key words recognized by the NLP module in the user's social media posts;

determining, via the NLP module, that a subject matter of the first media content is a first subject matter and that a subject matter of the second media content is a second subject matter;

prioritizing the first bookmark higher than the second bookmark based on the subject matter of the first media content being the first subject matter and the mood estimate being the first mood, wherein the prioritizing causes a recommendation that the user watch the first media content beginning at the first bookmark instead of the second media content; and displaying, based on the prioritizing of the first bookmark higher than the second bookmark, a notification, the notification includes the recommendation that the user view the first media content beginning at the first bookmark instead of the second media content.

* * * * *